(12) United States Patent
Fukunaka et al.

(10) Patent No.: US 12,117,392 B2
(45) Date of Patent: *Oct. 15, 2024

(54) GAS SENSOR

(71) Applicant: ASAHI KASEI MICRODEVICES CORPORATION, Tokyo (JP)

(72) Inventors: Toshiaki Fukunaka, Tokyo (JP); Hiroyuki Kato, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,441

(22) Filed: Aug. 4, 2023

(65) Prior Publication Data

US 2023/0375470 A1    Nov. 23, 2023

Related U.S. Application Data

(63) Continuation of application No. 17/485,585, filed on Sep. 27, 2021, now Pat. No. 11,747,273.

(30) Foreign Application Priority Data

Sep. 28, 2020   (JP) .................................. 2020-162656
Aug. 24, 2021   (JP) .................................. 2021-136579

(51) Int. Cl.
   *G01N 21/3504*   (2014.01)
   *G01N 15/06*   (2006.01)
   (Continued)

(52) U.S. Cl.
   CPC ......... *G01N 21/3504* (2013.01); *G01N 15/06* (2013.01); *G01N 15/075* (2024.01); *G01N 21/27* (2013.01); *G01N 2201/12* (2013.01)

(58) Field of Classification Search
   CPC .... G01N 21/3504; G01N 15/06; G01N 21/27; G01N 2015/0693; G01N 2201/12
   See application file for complete search history.

(56) References Cited

U.S. PATENT DOCUMENTS 6,501,156 B1    12/2002   Nakanishi et al.
6,518,659 B1 *   2/2003   Glenn .................. H01L 23/043
                                                    257/E23.185
(Continued)

FOREIGN PATENT DOCUMENTS

CN    1288261 A    3/2001
CN    1692501 A    11/2005
(Continued)

*Primary Examiner* — Benjamin R Schmitt
(74) *Attorney, Agent, or Firm* — Morgan, Lewis & Bockius LLP

(57) ABSTRACT

A gas sensor includes a light receiving element, a light emitting element, an integrated circuit, a lead frame, and a sealing member configured to seal these into a package. The lead frame includes at least one die pad portion and a plurality of terminal portions, the die pad portion includes a first region having a first thickness and a second region having a second thickness thinner than the first thickness, the integrated circuit is arranged on the second region of the die pad portion, the light emitting element is electrically connected to at least one of the plurality of terminal portions, the light receiving element is electrically connected to the integrated circuit and is arranged on the opposite side to the light emitting element with the integrated circuit interposed therebetween, and the integrated circuit is electrically connected to at least one of the plurality of terminal portions.

19 Claims, 10 Drawing Sheets

(51) Int. Cl.
　　　*G01N 15/075*　　　(2024.01)
　　　*G01N 21/27*　　　(2006.01)

(56) References Cited

U.S. PATENT DOCUMENTS

| | | |
|---|---|---|
| 6,667,543 B1 | 12/2003 | Chow et al. |
| 6,958,261 B2 | 10/2005 | Chow et al. |
| 10,082,464 B2 | 9/2018 | Camargo et al. |
| 10,551,314 B2 | 2/2020 | Camargo et al. |
| 11,262,374 B2 | 3/2022 | Otsuki et al. |
| 2004/0080029 A1 | 4/2004 | Chow et al. |
| 2014/0070101 A1* | 3/2014 | Matsushima .......... G01N 21/17 250/338.5 |
| 2015/0263186 A1 | 9/2015 | Miyata et al. |
| 2015/0303321 A1 | 10/2015 | Fukunaka et al. |
| 2016/0049526 A1 | 2/2016 | Oganesian et al. |
| 2016/0231244 A1 | 8/2016 | Camargo et al. |
| 2018/0348121 A1 | 12/2018 | Deliwala |
| 2019/0072489 A1 | 3/2019 | Camargo et al. |
| 2019/0162745 A1 | 5/2019 | Otsuki et al. |
| 2019/0360924 A1 | 11/2019 | Macrelli et al. |
| 2020/0326399 A1 | 10/2020 | Yoshida et al. |

FOREIGN PATENT DOCUMENTS

| | | |
|---|---|---|
| CN | 105308544 A | 2/2016 |
| CN | 105593666 A | 5/2016 |
| CN | 109839129 A | 6/2019 |
| CN | 111527415 A | 8/2020 |
| JP | 2012-215432 A | 11/2012 |
| JP | 2017-015567 A | 1/2017 |
| JP | 2018-136154 A | 8/2018 |
| WO | 2014/087619 A1 | 6/2014 |

\* cited by examiner

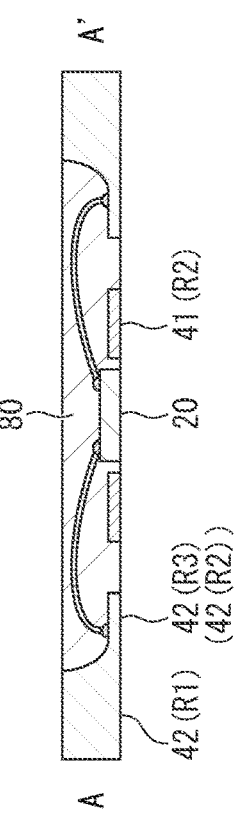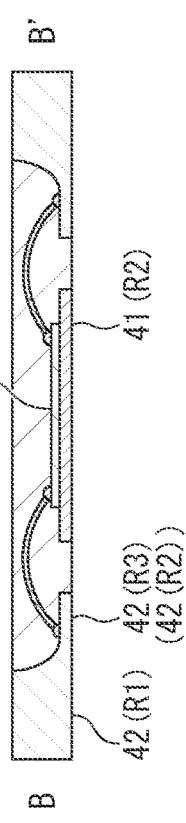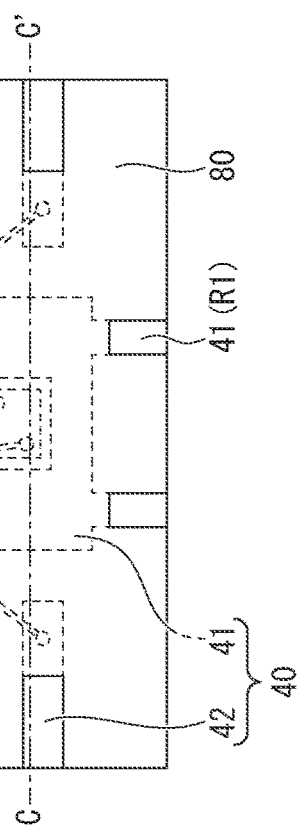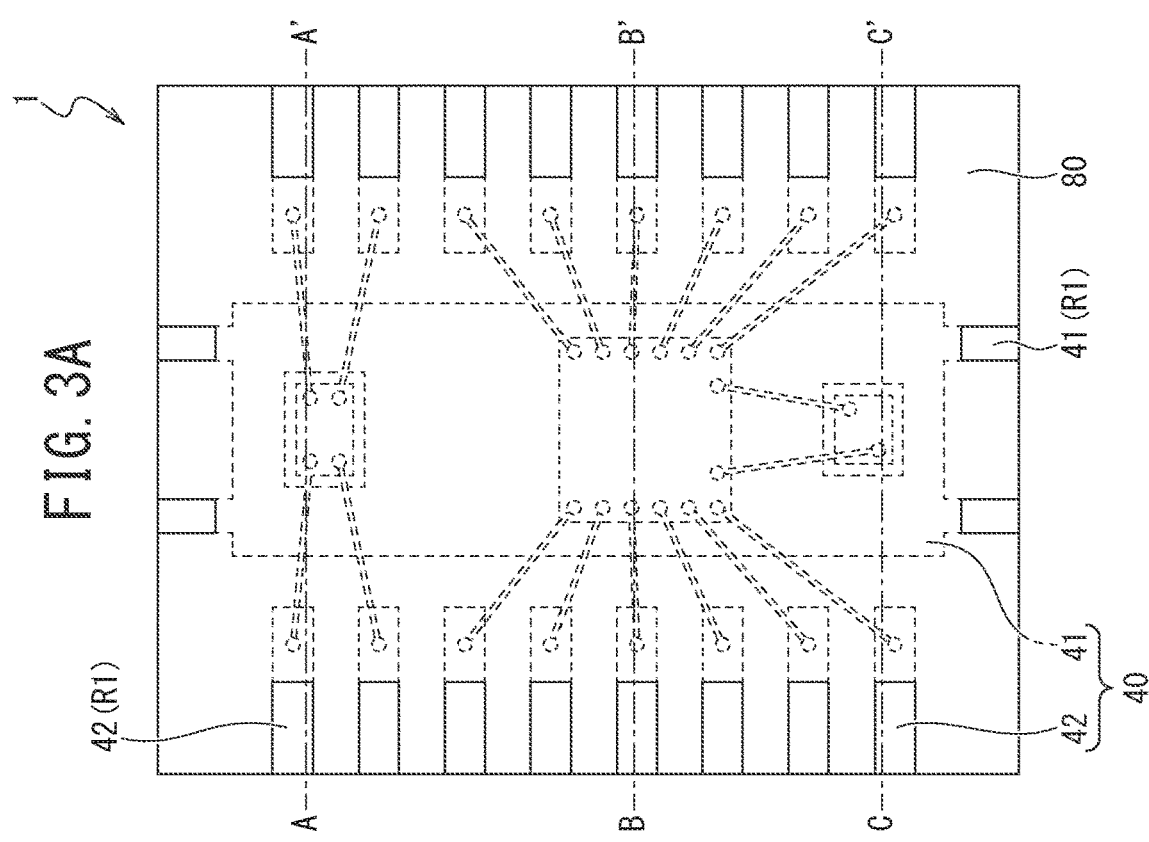

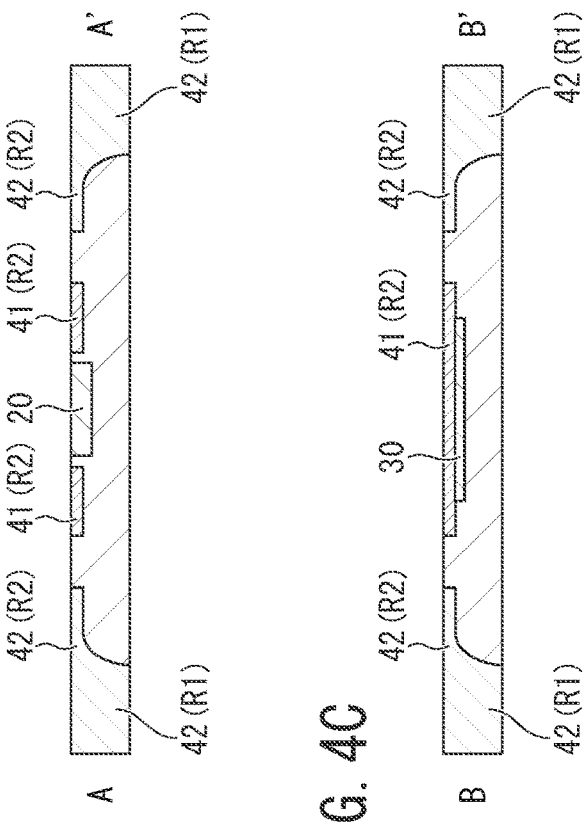
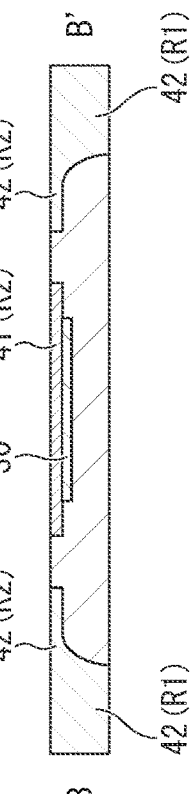
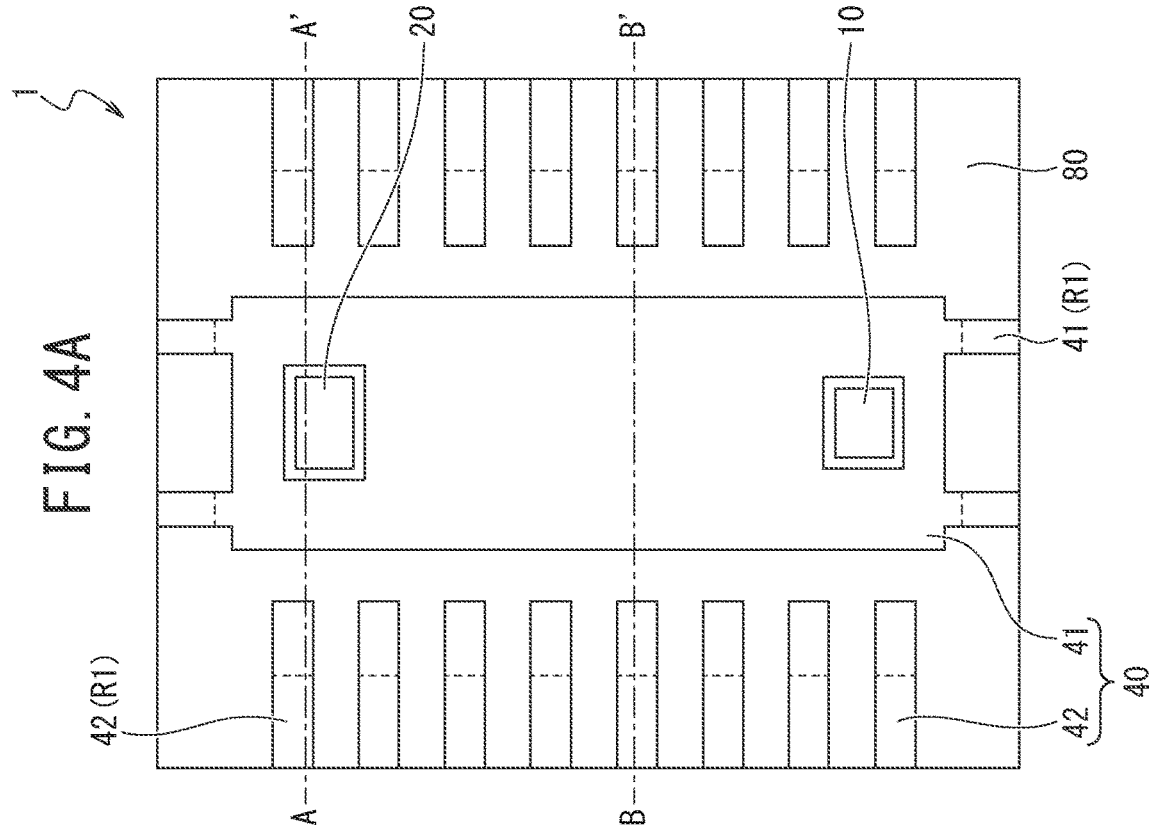

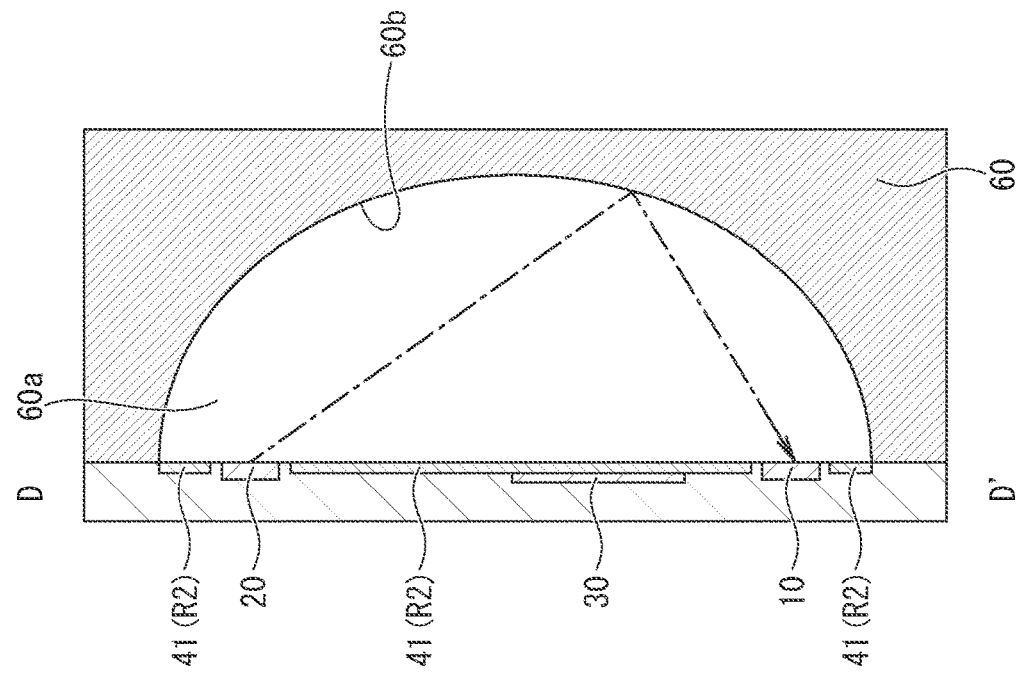
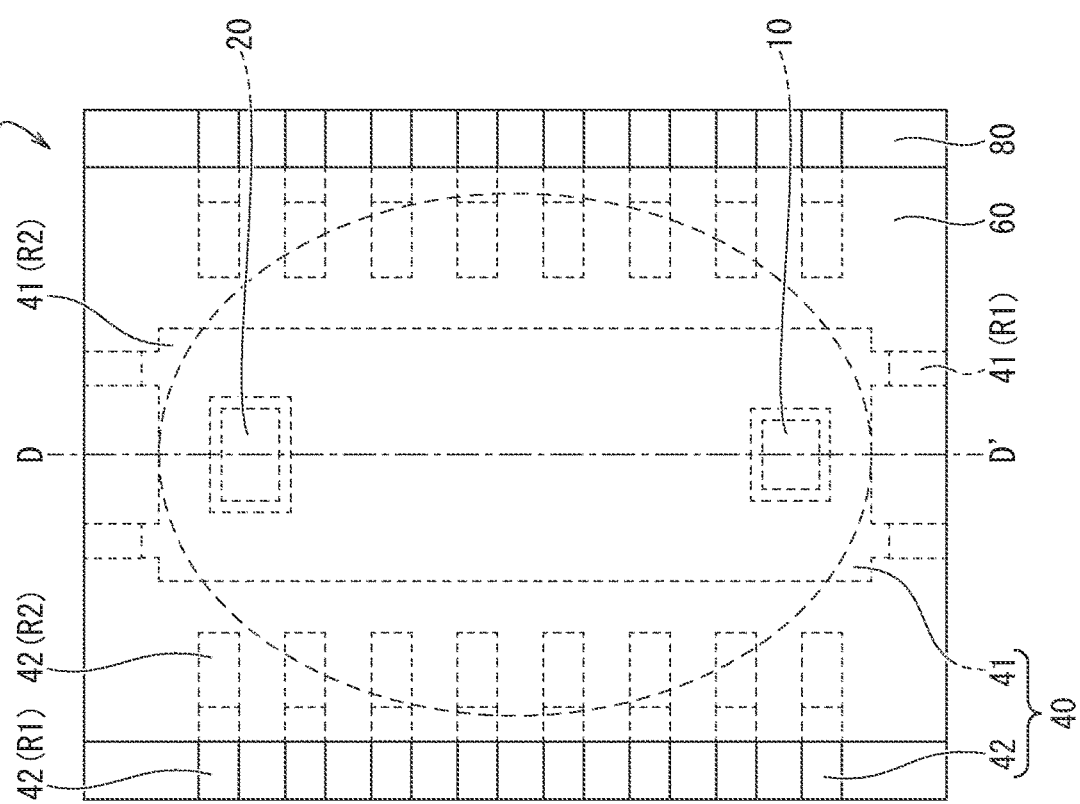

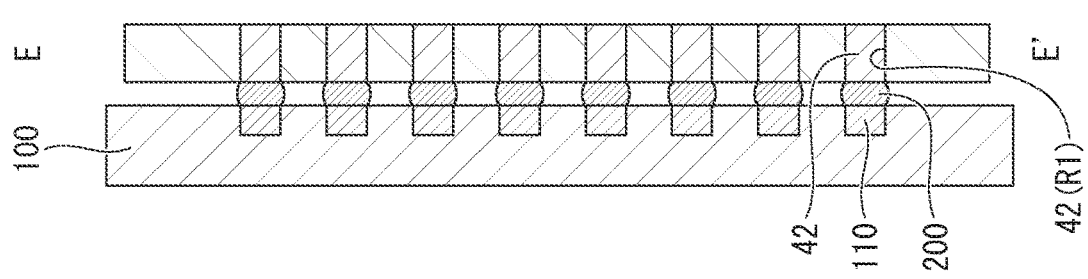
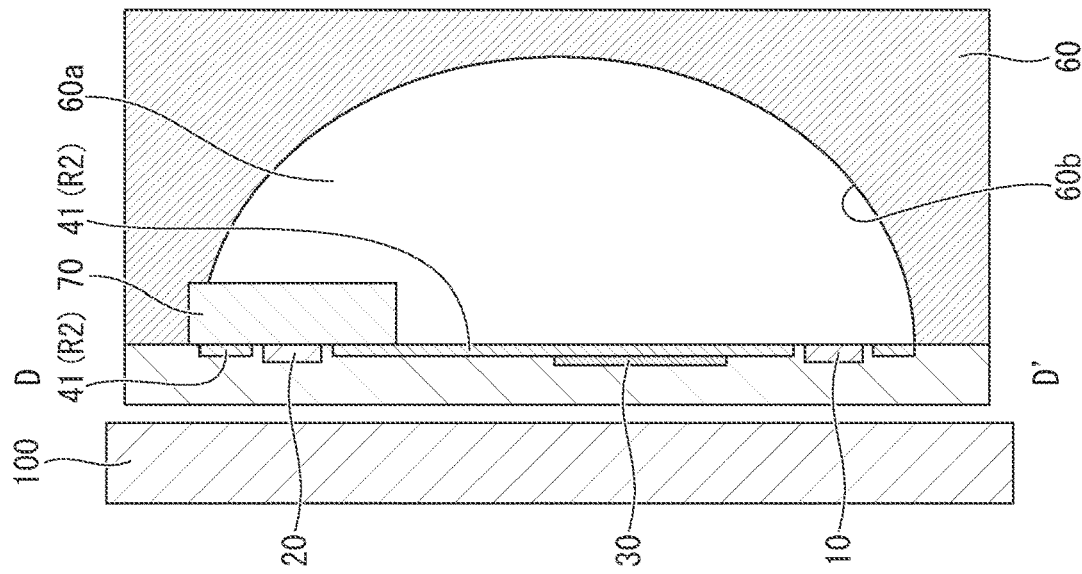
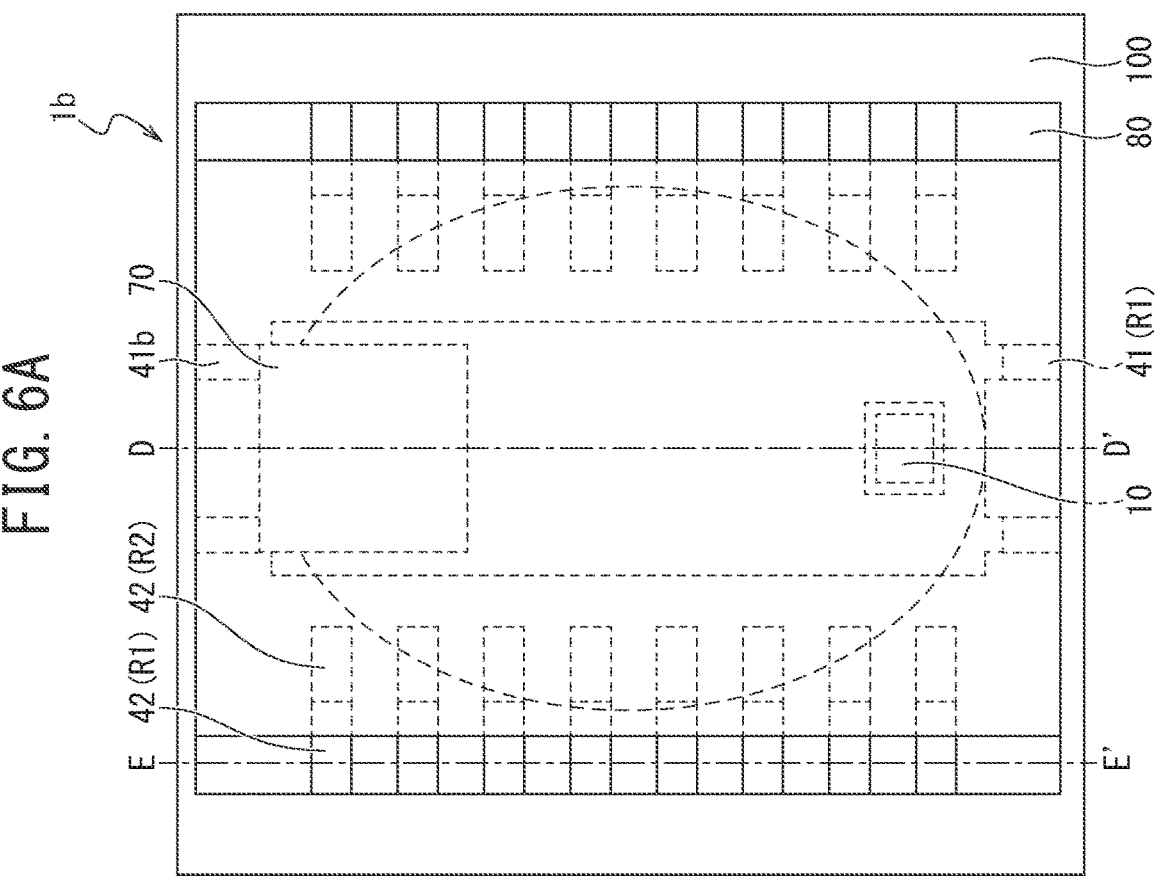

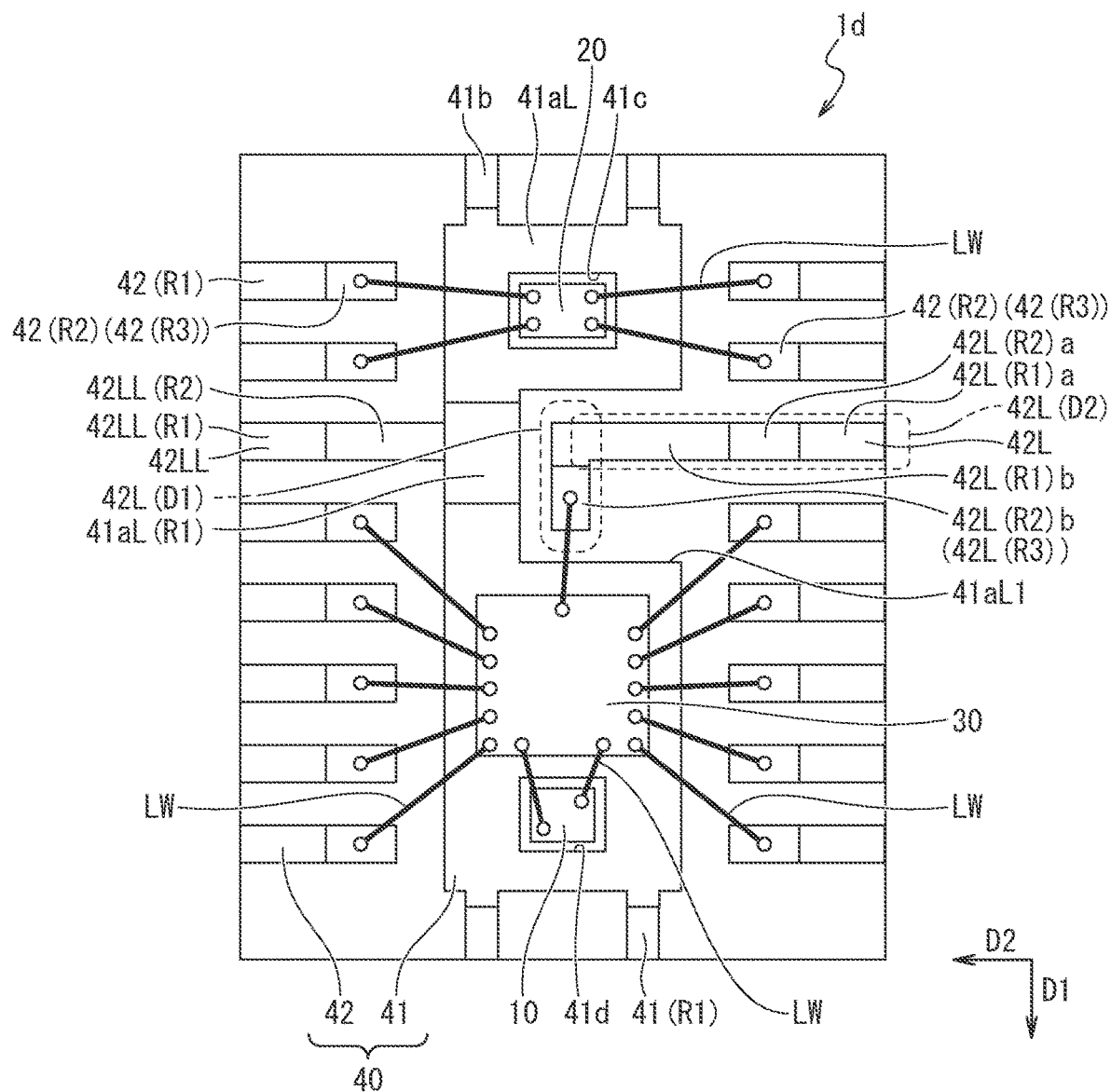

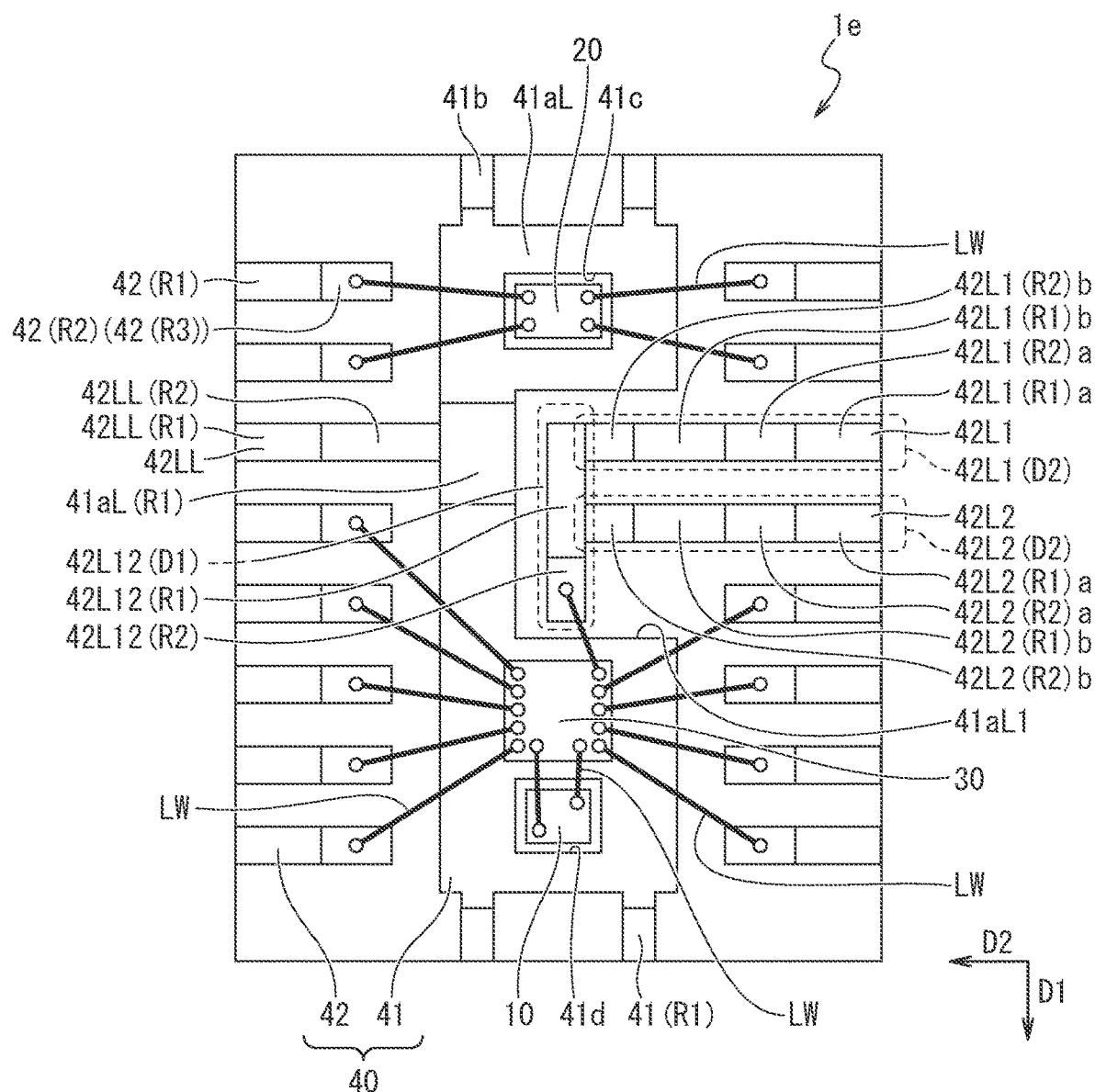

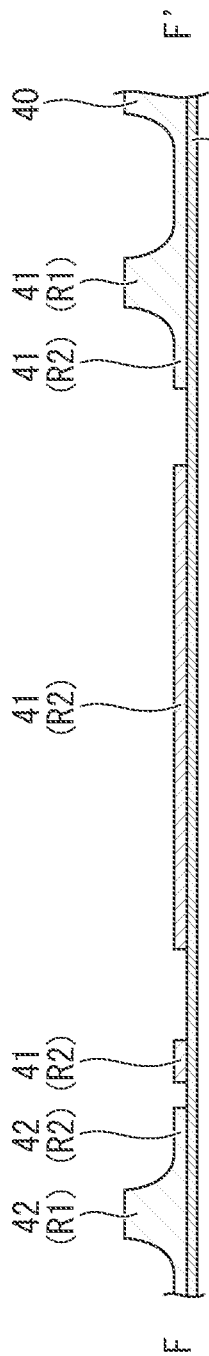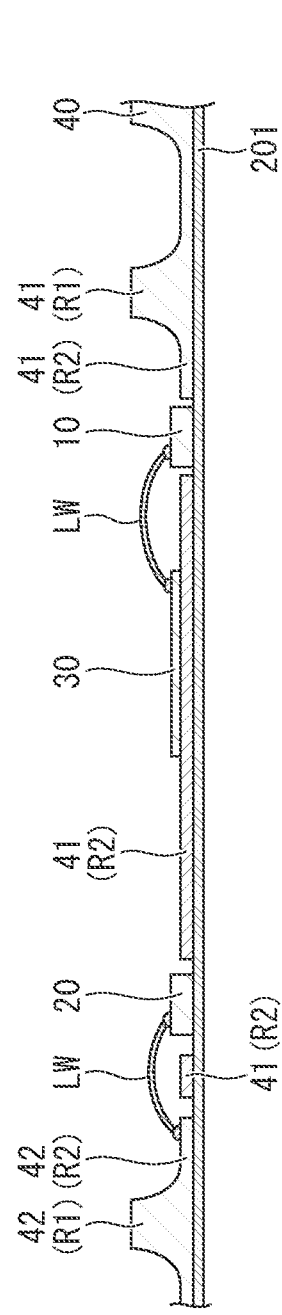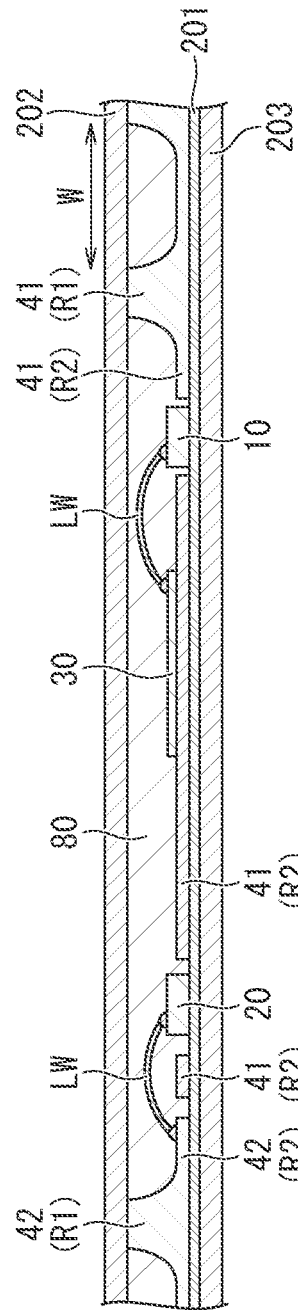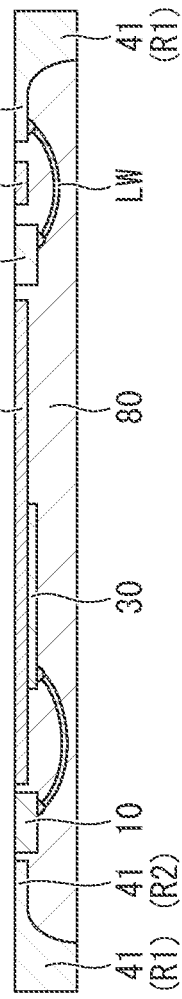
FIG. 10A
FIG. 10B
FIG. 10C
FIG. 10D

GAS SENSOR

RELATED APPLICATION DATA

This application is a continuation application of U.S. patent application Ser. No. 17/485,585, filed Sep. 27, 2021, and is based on and claims priority under 35 U.S.C. § 119 to Japanese Application 2021-136579, filed Aug. 24, 2021 and to Japanese Application 2020-162656, filed Sep. 28, 2020, the entire contents of each of these applications are incorporated herein by reference.

TECHNICAL FIELD

The present invention relates to a gas sensor.

BACKGROUND ART

Conventionally, as gas measurement apparatuses for concentration measurement of a gas to be measured in the atmosphere, non-dispersive infrared-type optical gas concentration measuring apparatuses configured to, using a feature that the wavelength of absorbed infrared rays differs depending on the type of gas, measure gas concentration by detecting the amount of absorption of infrared rays have been known.

For example, PTL 1 discloses a gas sensor including a light receiving element and a light emitting element.

CITATION LIST

Patent Literature

PTL 1: JP 2018-136154 A

SUMMARY OF INVENTION

Technical Problem

However, the current state is that what form is preferable for a gas sensor that, in addition to a light receiving element and a light emitting element, further includes an integrated circuit configured to perform gas concentration calculation has not been known. In particular, no gas sensor having a small size and enabling high precision measurement has been known.

Accordingly, an object of the present invention is to provide a gas sensor having a small size and enabling high precision measurement.

Solution to Problem

A gas sensor according to one embodiment of the present invention is a gas sensor including a light receiving element, a light emitting element, an integrated circuit, a lead frame, and a sealing member configured to seal the light receiving element, the light emitting element, the integrated circuit, and the lead frame into a package, in which the lead frame includes at least one die pad portion and a plurality of terminal portions, at least the die pad portion includes a first region having a first thickness and a second region having a second thickness thinner than the first thickness, the integrated circuit is arranged on the second region of the die pad portion, the light emitting element is neither electrically connected directly to the light receiving element nor to the integrated circuit and is electrically connected to at least one of the plurality of terminal portions, the light receiving element is electrically connected to the integrated circuit and is arranged on the opposite side to the light emitting element with the integrated circuit interposed between the light receiving element and the light emitting element, and the integrated circuit is electrically connected to at least one of the plurality of terminal portions.

A gas sensor according to another embodiment of the present invention is a gas sensor including a light receiving element, a light emitting element, an integrated circuit, a lead frame, and a sealing member configured to seal the light receiving element, the light emitting element, the integrated circuit, and the lead frame into a package, in which the lead frame includes at least one die pad portion and a plurality of terminal portions, the light emitting element is neither electrically connected directly to the light receiving element nor to the integrated circuit and is electrically connected to at least one of the plurality of terminal portions, the light receiving element is electrically connected to the integrated circuit and is arranged on the opposite side to the light emitting element with the integrated circuit interposed between the light receiving element and the light emitting element, and the integrated circuit is electrically connected to at least one of the plurality of terminal portions.

A gas sensor according to still another embodiment of the present invention is a gas sensor including a light receiving element, a light emitting element, an integrated circuit, a lead frame, and a sealing member configured to seal the light receiving element, the light emitting element, the integrated circuit, and the lead frame into a package, in which the lead frame includes at least one die pad portion and a plurality of terminal portions, at least the die pad portion includes a first region having a first thickness and a second region having a second thickness thinner than the first thickness, the integrated circuit is arranged on the second region of the die pad portion, the light emitting element is electrically connected to at least one of the plurality of terminal portions, the light receiving element is electrically connected to the integrated circuit and is arranged on the opposite side to the light emitting element with the integrated circuit interposed between the light receiving element and the light emitting element, the integrated circuit is electrically connected to at least one of the plurality of terminal portions, the first region of the die pad portion is arranged at a periphery of the second region and is arranged in such a way that the second region surrounds a portion of an end of the first region.

A gas sensor according to still another embodiment of the present invention is a gas sensor including a light receiving element, a light emitting element, an integrated circuit, a lead frame, and a sealing member configured to seal the light receiving element, the light emitting element, the integrated circuit, and the lead frame into a package, in which the lead frame includes at least one die pad portion and a plurality of terminal portions, the light receiving element is electrically connected to the integrated circuit, the plurality of terminal portions are arranged in line along the die pad portion on both sides of the die pad portion with the die pad portion interposed between the terminal portions, the integrated circuit is electrically connected to at least one of the plurality of terminal portions, at least one terminal portion among terminal portions electrically connected to the integrated circuit includes a region extending in a second direction, the second direction intersecting a direction in which the plurality of terminal portions are lined, and a region extending in a first direction, the first direction intersecting the second direction and coming close to the integrated circuit, between the integrated circuit and the light emitting element and includes a bonding region at a tip of the region extending in the first direction, and the integrated circuit and the bonding region are connected to each other by a conductive wire.

A gas sensor according to still another embodiment of the present invention is a gas sensor including a light receiving element, a light emitting element, an integrated circuit, a lead frame, and a sealing member configured to seal the light receiving element, the light emitting element, the integrated circuit, and the lead frame into a package, in which the lead frame includes at least one die pad portion and a plurality of terminal portions, at least the die pad portion includes a first region having a first thickness and a second region having a second thickness thinner than the first thickness, the integrated circuit is arranged on the second region of the die pad portion, the light receiving element is electrically connected to the integrated circuit, the plurality of terminal portions are arranged in line along the die pad portion on both sides of the die pad portion with the die pad portion interposed between the terminal portions, the integrated circuit is electrically connected to at least one of the plurality of terminal portions, at least one terminal portion among terminal portions electrically connected to the integrated circuit includes a region extending in a second direction, the second direction intersecting a direction in which the plurality of terminal portions are lined, and a region extending in a first direction, the first direction intersecting the second direction and coming close to the integrated circuit, between the integrated circuit and the light emitting element and includes a bonding region at a tip of the region extending in the first direction, and the integrated circuit and the bonding region are connected to each other by a conductive wire.

Advantageous Effects of Invention

An aspect of the present invention enables a gas sensor having a small size and enabling high precision measurement to be provided.

BRIEF DESCRIPTION OF DRAWINGS

FIGS. 3A to 3D are another planar schematic diagram and cross-sectional views illustrative of the example of the gas sensor according to the first embodiment of the present invention;

FIGS. 4A to 4C are a back surface schematic diagram and cross-sectional views illustrative of the example of the gas sensor according to the first embodiment of the present invention;

FIGS. 5A and 5B are a schematic diagram viewed from the light reflection portion side and a cross-sectional view illustrative of an example of a gas sensor according to a second embodiment of the present invention;

FIGS. 6A to 6C are a back surface schematic diagram and cross-sectional views illustrative of a variation of the gas sensor according to the second embodiment of the present invention;

FIG. 8 is a planar schematic diagram illustrative of an example of a gas sensor according to a fourth embodiment of the present invention;

FIG. 9 is a planar schematic diagram illustrative of a variation of the gas sensor according to the fourth embodiment of the present invention; and FIGS. 10A to 10D are flowcharts illustrative of an example of a manufacturing process of the gas sensor according to the first embodiment of the present invention.

DESCRIPTION OF EMBODIMENTS

Embodiments of the present invention will now be described with reference to the drawings. In the following description of the drawings, the same or similar reference signs are assigned to the same or similar portions. However, it should be noted that the drawings are schematic and relations between thicknesses and planar dimensions and the like are different from actual ones. The following embodiment indicates devices and methods to embody the technical idea of the present invention by way of example, and the technical idea of the present invention does not limit the materials, shapes, structures, arrangements, and the like of the constituent components to those described below. The technical idea of the present invention can be subjected to a variety of alterations within the technical scope prescribed by the claims described in CLAIMS.

First Embodiment

Figure 1:
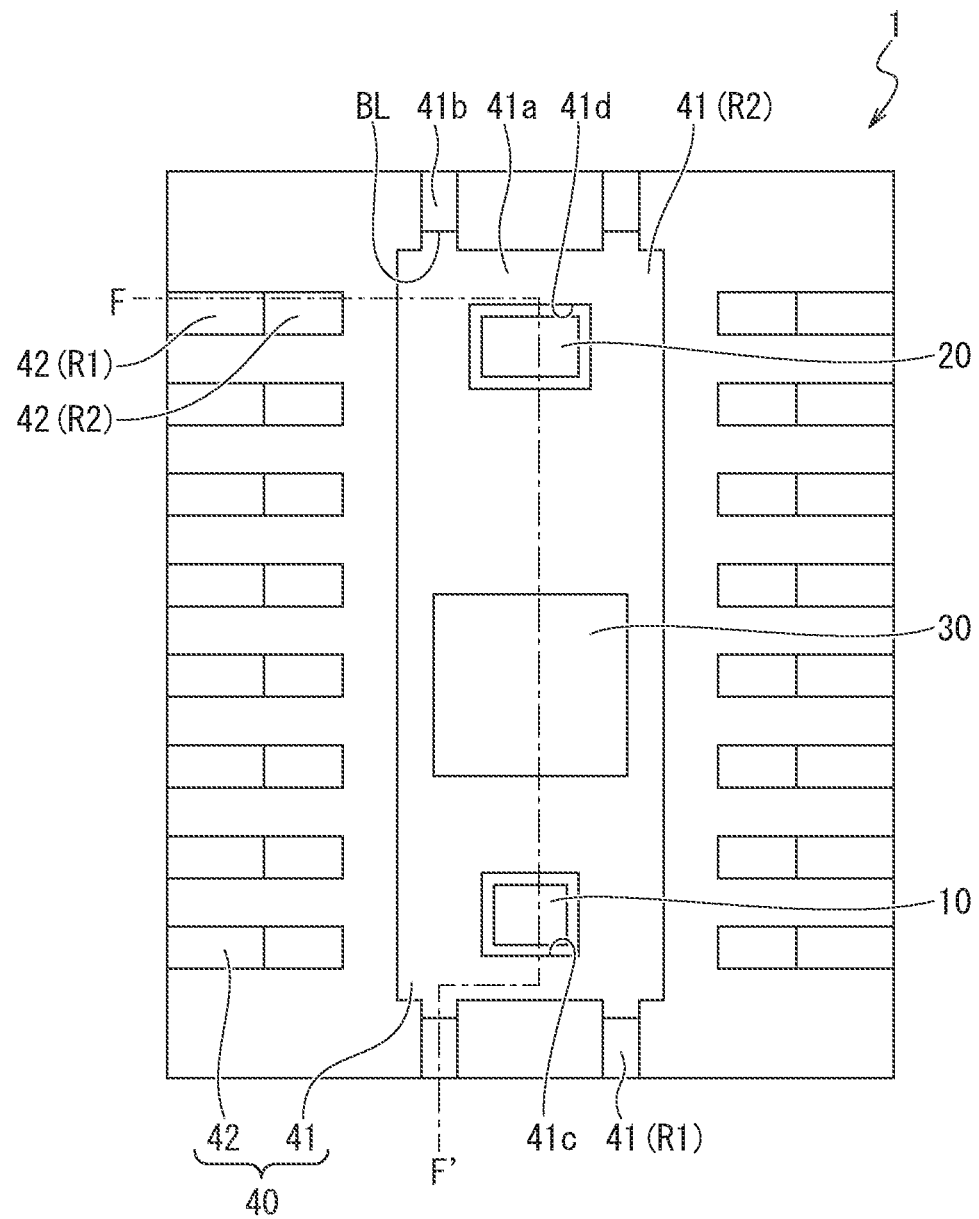
FIG. 1 is a planar schematic diagram illustrative of an example of a gas sensor according to a first embodiment of the present invention.

FIGS. 1, 2, 3A to 3D, and 4A to 4C are schematic diagrams illustrative of an example of a gas sensor according to a first embodiment of the present invention. FIG. 1 is a schematic diagram illustrative of an example of the gas sensor according to the first embodiment and is a planar schematic diagram viewed from a surface on the mounting surface side, which is connected to an external device. Herein, it is assumed that a surface on the mounting surface side of a gas sensor 1 is the front surface and a surface on the opposite side thereto is the back surface. Note that, in FIG. 1, illustrations of connection wiring and a sealing member are omitted for facilitating understanding.

In FIG. 1, reference signs 1, 10, 20, and 30 indicate the gas sensor, a light receiving element, a light emitting element, and an integrated circuit, respectively, and reference signs 41 and 42 respectively indicate portions of a conductive lead frame 40 and, specifically, the reference signs 41 and 42 indicate a die pad portion and terminal portions, respectively. The die pad portion 41 and the terminal portions 42 are separated from each other. In addition, in each of the die pad portion 41 and the terminal portions 42, reference signs R1 and R2 indicate a first region that has a first thickness and a second region that has a second thickness thinner than the first thickness, respectively.

The gas sensor 1 is formed in a rectangle when viewed in plan, and, in a central portion in the width direction of the gas sensor 1, the die pad portion 41, which extends in the longitudinal direction of the gas sensor 1, is arranged and, on both right and left sides of the die pad portion 41, a plurality of terminal portions 42 are arranged in line along the die pad portion 41.

The die pad portion 41 has a rectangular portion 41a that is formed in a rectangle and that extends along the longitudinal direction of the gas sensor 1 and projecting portions 41b that are formed on each of both edges in the longitudinal direction of the rectangular portion 41a. Two projecting portions 41b are formed at locations close to the ends in the width direction of the rectangular portion 41a with a space interposed therebetween on each edge in the longitudinal direction of the rectangular portion 41a, the projecting portions 41*b* on each of both edges in the longitudinal direction are formed at locations equidistant from the central point in the width direction of the rectangular portion 41*a*, and the ends of the projecting portions 41*b* reach the edges in the longitudinal direction of the gas sensor 1. On one end side in the longitudinal direction of a central portion in the width direction of the rectangular portion 41*a*, a rectangular opening 41*c* for arranging the light receiving element 10 (hereinafter, referred to as a light receiving element arrangement region) is formed, and, on the other end side, a rectangular opening 41*d* for arranging the light emitting element 20 (hereinafter, referred to as a light emitting element arrangement region) is formed.

The terminal portions 42 have the same shape and are formed in an elongated rectangular shape, and the respective terminal portions 42 have one ends arranged in line at equal intervals along either of the long sides of the rectangular portion 41*a* in such a manner as to face either of the long sides with a constant gap interposed therebetween and the other ends formed in such a manner as to reach either of the edges in the width direction of the gas sensor 1. The terminal portions 42 on the right and left sides with the die pad portion 41 interposed therebetween are arranged in line symmetry about the central line extending in the longitudinal direction of the gas sensor 1.

The rectangular portion 41*a* of the die pad portion 41 and a region of each of the projecting portions 41*b*, the region continuing to the rectangular portion 41*a* and occupying approximately one-third of the whole of the projecting portion 41*b*, form a second region 41(R2) having the second thickness. A region of each of the projecting portions 41*b*, the region being the projecting portion 41*b* excluding the second region 41(R2) and being on the opposite side to the rectangular portion 41*a*, forms a first region 41(R1) having the first thickness. A region of each of the terminal portions 42, the region being a region close to the rectangular portion 41*a* and being slightly smaller than a half of the whole of the terminal portion 42, forms a second region 42(R2) having the second thickness. A region of each of the terminal portions 42, the region being the terminal portion 42 excluding the second region 42(R2), being on the opposite side to the rectangular portion 41*a*, and being slightly larger than a half of the whole of the terminal portion 42, forms a first region 42(R1) having the first thickness.

The light receiving element 10 is arranged in a light receiving element arrangement region 41*c*, and the light emitting element 20 is arranged in a light emitting element arrangement region 41*d*. In other words, the light receiving element 10 and the light emitting element 20 are arranged at locations the peripheries of which are surrounded by the second region 41(R2) of the die pad portion 41. The integrated circuit 30 is arranged at the center in the width direction of the rectangular portion 41*a* slightly on the light receiving element 10 side of the center in the longitudinal direction of the rectangular portion 41*a*. In other words, the integrated circuit 30 is arranged on the second region 41(R2) of the die pad portion 41.

As illustrated in FIGS. 3A to 3D, which will be described later, by disposing a sealing member 80 in such a manner as to contain the whole of the lead frame 40 within the outer shape thereof, the gas sensor 1 is packaged in a substantially rectangular parallelepiped shape.

Note that, although, in FIG. 1, one integrated circuit is arranged on the second region 41(R2) of the die pad portion 41, the gas sensor 1 may include a plurality of integrated circuits 30 and the plurality of integrated circuits 30 may be arranged on the second region 41(R2) of the die pad portion 41.

Figure 2:
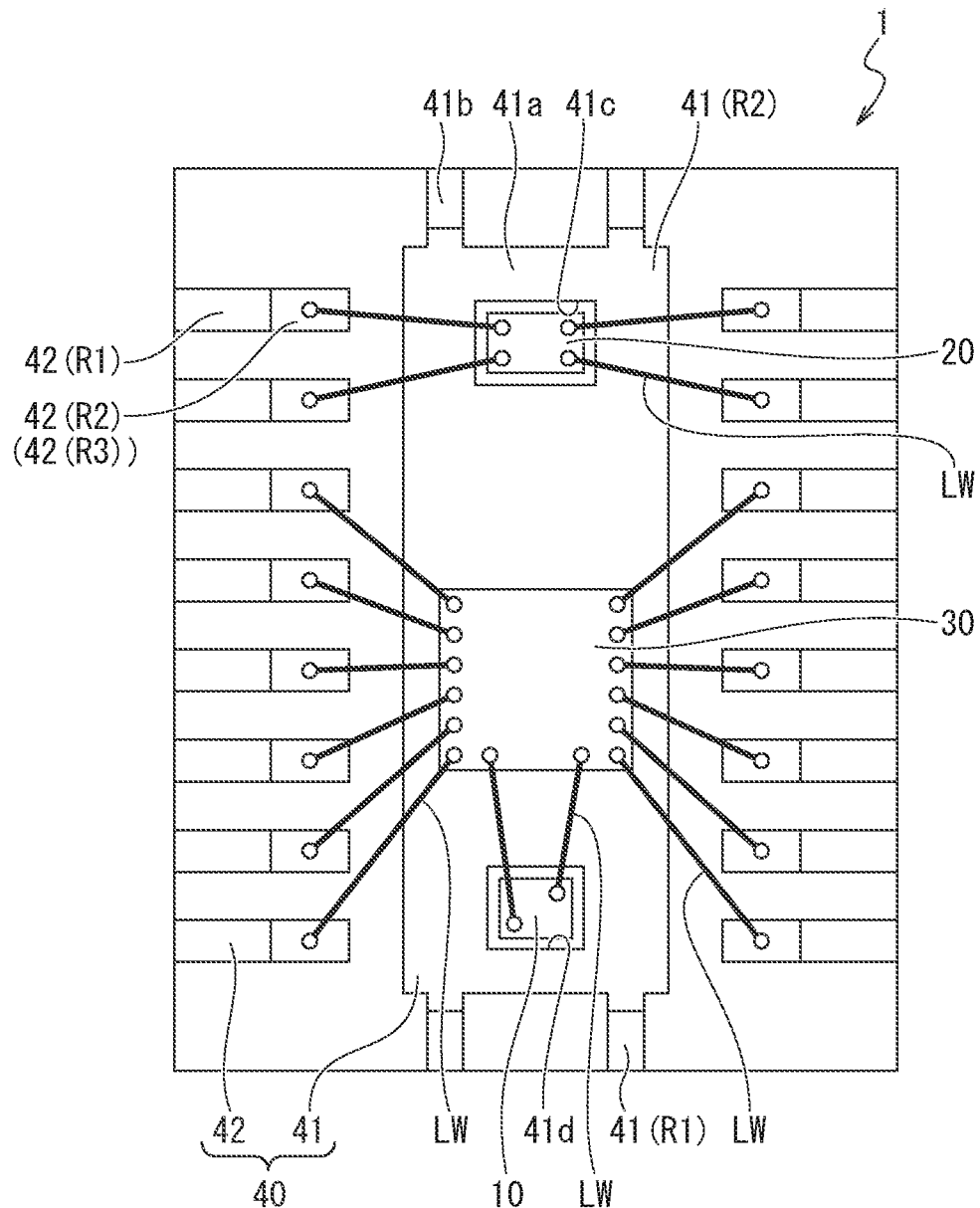
FIG. 2 is another planar schematic diagram illustrative of the example of the gas sensor according to the first embodiment of the present invention.

FIG. 2 is a diagram illustrated by adding electrical connection relationships to the planar schematic diagram of the gas sensor 1 illustrated in FIG. 1. In gas sensor 1, electrical connections are achieved by using conductive wires LW.

As illustrated in FIG. 2, the light emitting element 20 has two terminals on each of both sides of the light emitting element 20 along the longitudinal direction of the die pad portion 41. The respective terminals of the light emitting element 20 are connected to, among the plurality of terminal portions 42 arranged along the longitudinal direction of the die pad portion 41, in total four terminal portions 42 that are composed of two terminal portions 42 on each of the right side and the left side, the two terminal portions 42 being arranged on the side where the edge of the gas sensor 1 on the light emitting element 20 side is located. The respective terminals of the light emitting element 20 are connected only to the second regions 42 (R2) of the terminal portions 42, and the terminals and the second regions 42(R2) are directly connected to each other by conductive wires LW. The light emitting element 20 is neither directly connected to the light receiving element 10 nor to the integrated circuit 30. As used herein, the terms "directly connected" mean being connected only by one conductive wire LW.

The light receiving element 10 has a terminal on each of the right end side of an edge on the integrated circuit 30 side and the left end side of an edge on the opposite side to the integrated circuit 30, as illustrated in FIG. 2. The light receiving element 10 is connected only to the integrated circuit 30, and the respective terminals of the light receiving element 10 are connected to two terminals that are disposed on an edge portion on the light receiving element side of the integrated circuit 30, by conductive wires LW.

As illustrated in FIG. 2, the integrated circuit 30 has, for example, in total twelve terminals that are composed of six terminals on each of the right edge side and the left edge side of the integrated circuit 30 and also has two terminals on the light receiving element 10 side. The twelve terminals formed on the right and left sides of the integrated circuit are respectively connected to, among the plurality of terminal portions 42 arranged on both sides of the die pad portion 41 along the longitudinal direction thereof, in total twelve terminal portions 42 that remain after excluding the terminal portions 42 connected to the light emitting element 20. Specifically, the terminals formed at the right and left edges of the integrated circuit 30 are connected to the second regions 42(R2) of the terminal portions 42 by conductive wires LW. The second region 42(R2) of each terminal portion 42 serves as a bonding region 42(R3). The thickness of the bonding regions 42(R3) are not limited to a specific value as long as being thinner than the thickness of the first regions 42(R1). There are some cases where, from a viewpoint of process easiness, the thickness of the bonding regions 42(R3) are preferably the same as the thickness of the second region 41(R2) of the die pad portion 41, as illustrated in FIG. 2.

Note that the bonding regions 42(R3) (that is, the second regions 42(R2)) may have surfaces thereof subjected to plating.

FIGS. 3A to 3D are diagrams illustrated by adding the sealing member 80 to the gas sensor 1 illustrated in FIG. 2, and FIG. 3A is a schematic diagram of the gas sensor 1 in plan view. FIGS. 3B, 3C, and 3D are cross-sectional schematic diagrams taken along the lines A-A', B-B', and C-C' in FIG. 3A, respectively.

As illustrated in FIGS. 3A to 3D, the sealing member 80 is formed in such a manner as to cover an area excluding the first regions 41(R1) and 42(R1) of the lead frame 40 and including the light receiving element 10, the light emitting element 20, the integrated circuit 30, the conductive wires LW, and the second regions 41(R2) and 42(R2) of the lead frame and to be flush with the surfaces of the first regions 41(R1) and 42(R1) of the lead frame 40.

It can be understood that, as a result, in the planar schematic diagram illustrated in FIG. 3A, the surface of the gas sensor 1 in plan view, that is, the surface located on the upper side in the cross-sectional schematic diagrams illustrated in FIGS. 3B to 3D, is in a state in which only the sealing member 80, the first regions 41(R1) (not shown) of the die pad portion 41, and the first regions 42(R1) of the terminal portions 42 are exposed.

FIG. 4A is a back surface schematic diagram illustrating the gas sensor 1 illustrated in FIGS. 3A to 3D that is viewed from the back side, that is, the side where a surface from which a portion of each of the light receiving element 10 and the light emitting element 20 is exposed is located. FIGS. 4B and 4C are cross-sectional schematic diagrams taken along the lines A-A' and B-B' in FIG. 4A, respectively. Note that, for the sake of simplification, illustrations of the conductive wires LW are omitted.

It can be understood that, from the back surface of the gas sensor 1 illustrated in FIG. 4A, that is, a surface on the upper side in the cross-sectional schematic diagrams illustrated in FIGS. 4B and 4C, the back surface of the die pad portion 41, the back surfaces of the terminal portions 42, the back surface of the light receiving element 10, the back surface of the light emitting element 20, and the sealing member 80 are exposed.

This configuration is sometimes preferable because the die pad portion 41 being exposed between the light receiving element 10 and the light emitting element 20 on the back surface of the gas sensor 1 as illustrated in FIGS. 4A to 4C and forming the die pad portion 41, using a conductive material having a high reflectance enable infrared rays emitted from the light emitting element 20 to reach the light receiving element 10 more efficiently in a form of the gas sensor 1 including a light path as described in a second embodiment, which will be described later.

When the gas sensor 1 is viewed in plan as illustrated in FIG. 2, the gas sensor 1 has a structure in which the light receiving element 10 and the light emitting element 20 are surrounded by the second region 41(R2) of the die pad portion 41 and a structure in which the integrated circuit 30 is arranged on the second region 41(R2) of the die pad portion 41. Hence, forming the die pad portion 41, that is, the lead frame 40, using a material having a high thermal conductivity causes temperature inside the package to be uniformized. Thus, temperature characteristics compensation with higher precision becomes possible, and concentration measurement with higher precision becomes possible. When the gas sensor 1 is embodied in a form of measuring temperature in the package, using diode characteristics inside the integrated circuit 30, effect of temperature inside the package being uniformized is caused to emerge more effectively.

The integrated circuit 30 is not particularly limited, provided that the integrated circuit 30 is electrically connected to the light receiving element 10 and at least one of the terminal portions 42. The integrated circuit 30 preferably include at least one, and preferably all, of (1) a circuit configured to store calibration parameters of respective units, such as the light receiving element 10 and the light emitting element 20, that require calibration and capable of outputting the calibration parameters, (2) a circuit configured to amplify a signal from the light receiving element 10 and subject the signal to AD conversion, (3) a circuit configured to output a driving signal that drives the light emitting element 20, (4) a circuit configured to perform intermittent drive control of the light receiving element 10 and the light emitting element 20, and (5) an interface circuit to an external instrument (such as a signal processing circuit).

The gas sensor 1 configured in this manner drives the light emitting element 20 and receives light radiated from the light emitting element 20, using the light receiving element 10 in a space in which gas the concentration of which is to be measured is present and, after having performed calibration and the like of parameter signals relating to the light receiving element 10, the light emitting element 20, and the like on the received signal, using the integrated circuit 30, outputs the calibrated signal to an external instrument as a sensor signal, and the external instrument performs concentration calculation and the like of the gas to be measured, based on the sensor signal.

Advantageous Effects of First Embodiment

The gas sensor 1 according to the first embodiment includes the configuration illustrated in FIGS. 1, 2, 3A to 3D, and 4A to 4C. Therefore, the die pad portion 41 that has excellent heat conduction enables temperature of the light receiving element 10, the light emitting element 20, and the integrated circuit 30 in the package to be uniformized. As a result, calibrating a parameter signal reflecting characteristics of at least one of the respective units, such as the light receiving element 10 and the light emitting element 20, based on the temperature of the integrated circuit enables temperature characteristic compensation to be performed with higher precision, and, consequently, it is possible to perform concentration measurement with higher precision.

In addition, the die pad portion 41 having the first regions 41(R1), which have the first thickness, and the second region 41(R2), which has the second thickness thinner than the first thickness, and the integrated circuit 30 being arranged on the second region 41(R2), the thickness of which is thin, while enabling miniaturization, enable high precision measurement.

Not only does performing calibration based on the temperature of the integrated circuit 30 in the package enable temperature characteristic compensation to be performed, but also incorporating an integrated circuit, which is generally disposed externally, into the same package enables the entire gas sensor 1 to be miniaturized.

Since the light emitting element 20 is neither electrically connected directly to the light receiving element 10 nor to the integrated circuit 30, the gas sensor 1 has a high degree of freedom in layout, and it is possible to increase precision of temperature characteristic compensation caused by a layout and to achieve the gas sensor 1 that is further miniaturized.

Second Embodiment

Next, a second embodiment of the present invention will be described.

FIGS. 5A and 5B are schematic diagrams of a gas sensor 1a according to the second embodiment, and the gas sensor 1a is configured by further disposing a light reflection portion 60 that has a dome-shaped cavity portion 60a on the inside thereof, on the back surface side of the gas sensor 1 illustrated in FIGS. 4A to 4C.

The light reflection portion 60 is formed in a rectangular parallelepiped shape when viewed in plan, and the rectangular parallelepiped shape is formed with a width that causes second regions 42(R2) and portions on the second region 42(R2) side of first regions 42(R1) of respective terminal portions 42 to be covered and a length that causes the whole of first regions 41(R1) of a die pad portion 41 to be covered. The light reflection portion 60 has, on the inside thereof, a reflecting surface 60b the surface of which facing a light receiving surface of a light receiving element 10 and a light emitting surface of a light emitting element 20 is an ellipsoid and that is formed in a dome shape, and the cavity portion 60a is formed in a size that causes the light receiving element 10 and the light emitting element 20 to be contained within the cavity portion 60a when viewed from the back surface side. A material of a portion formed as the reflecting surface 60b of the light reflection portion 60 is preferably a metal or a multilayered dielectric material.

Note that, although, in the present embodiment, a single integrated circuit 30 is also arranged on a second region 41(R2) of the die pad portion 41, the gas sensor 1 may include a plurality of integrated circuits 30 and the plurality of integrated circuits 30 may be arranged on the second region 41(R2) of the die pad portion 41.

Note that the whole shape of the light reflection portion 60 may be any shape, provided that the light reflection portion 60 has a dome-shaped reflecting surface 60b.

In the light reflection portion 60, a not-illustrated vent that penetrates the light reflection portion 60 is formed, and it is configured such that, through the vent, gas to be measured is introduced into the cavity portion 60a and the gas to be measured is also exhausted to the outside of the cavity portion 60a. The gas sensor 1a, based on a detection signal detected by the light receiving element 10 with gas to be measured having been introduced into the cavity portion 60a, performs predetermined processing in the integrated circuit 30 and outputs a signal matching the detection signal, and a not-illustrated external device that is electrically connected to the integrated circuit 30 performs concentration calculation and the like, based on the detection signal input from the integrated circuit 30.

As described above, in the second embodiment, the light reflection portion 60 having the dome-shaped reflecting surface 60b on the inside thereof is formed. This configuration is sometimes preferable because, as a result of the configuration, it is possible to facilitate guiding infrared rays emitted from the light emitting element 20 to the light receiving element 10. In addition, forming the die pad portion 41 of a conductive material having a high reflectance enables infrared rays emitted from the light emitting element 20 to reach the light receiving element 10 more efficiently.

Variation of Second Embodiment

FIGS. 6A to 6C are schematic diagrams illustrative of a variation of the gas sensor 1a according to the second embodiment, and the variation is configured by further including an optical member 70 and a mounting board 100 in the gas sensor 1a, which includes the light reflection portion 60, illustrated in FIGS. 5A and 5B. FIG. 6A is a schematic diagram when a gas sensor 1b in the variation is viewed from a surface on the opposite side to the light reflection portion 60, that is, the back surface side, and FIGS. 6B and 6C are cross-sectional schematic diagrams taken along the lines D-D' and E-E' in FIG. 6A, respectively.

The optical member 70 is constituted by a filter block that is a not-illustrated optical filter the side surfaces of which are covered by a sealing portion. The optical filter has a function of transmitting light within a desired wavelength range selectively (that is, with high transmittance). As a material of which an optical member constituting the optical filter is made, a material, such as silicon (Si) and glass ($SiO_2$), that transmits light within a preset wavelength range is used. However, without being limited to the configuration, the optical filter may have a configuration in which a thin film is disposed on an optical member by means of vapor deposition or the like or may be a dielectric multilayer film filter that is formed by stacking dielectric materials having different refractive indices in a multilayer form on an optical member.

As illustrated in FIG. 6A, the optical member 70 is formed in a substantially square shape when viewed from the back surface side, one side of the optical member 70 has a length equal to a distance between the outer edges of two projecting portions 41b of the die pad portion 41, and the optical member 70 is arranged in such a way that boundaries between the first regions 41(R1) and the second regions 41(R2) of projecting portions 41b, which are disposed at an edge on the light emitting element 20 side of the die pad portion 41, and the one side of the optical member 70 overlap each other when viewed from the back surface side and the optical member 70 further overlaps the light emitting element 20.

This configuration is sometimes preferable because including the optical member 70 as illustrated in FIGS. 6A to 6C enables light emission and/or light reception of infrared rays having specific wavelength to be achieved easily.

Note that, although FIGS. 6A to 6C illustrate an example in which the optical member 70 is arranged on the light emitting element 20 side, the optical member 70 may be arranged on the light receiving element 10 side.

In addition, the optical member 70 may directly cover the surface of the light emitting element 20 or the light receiving element 10 or may indirectly cover the surface of the light emitting element 20 or the light receiving element 10 with another substance or space interposed therebetween. In other words, the optical member 70 is only required to be arranged in a light path along which light having been emitted from the light emitting element 20 travels until the light is incident on the light receiving element 10.

The mounting board 100 is larger than the package integrated by the sealing member 80 and includes mounting terminals 110 at locations facing the first regions 42(R1) of the terminal portions 42. FIGS. 6A to 6C illustrate a case where the mounting board 100 includes in total sixteen mounting terminals 110 that are composed of eight mounting terminals 110 on each of the right side and the left side. Each of the mounting terminals 110 is to be electrically connected to the first region 42(R1) of one of the terminal portions 42 via a metal bump 200 (FIG. 6C). Note that, although not illustrated, it is preferable that, by electrically connecting the mounting board 100 and the terminal portions 42 to each other via the metal bumps 200, the light emitting element 20 be electrically connected to the integrated circuit 30 via the mounting board 100.

Third Embodiment

Next, a third embodiment of the present invention will be described.

Figure 7:
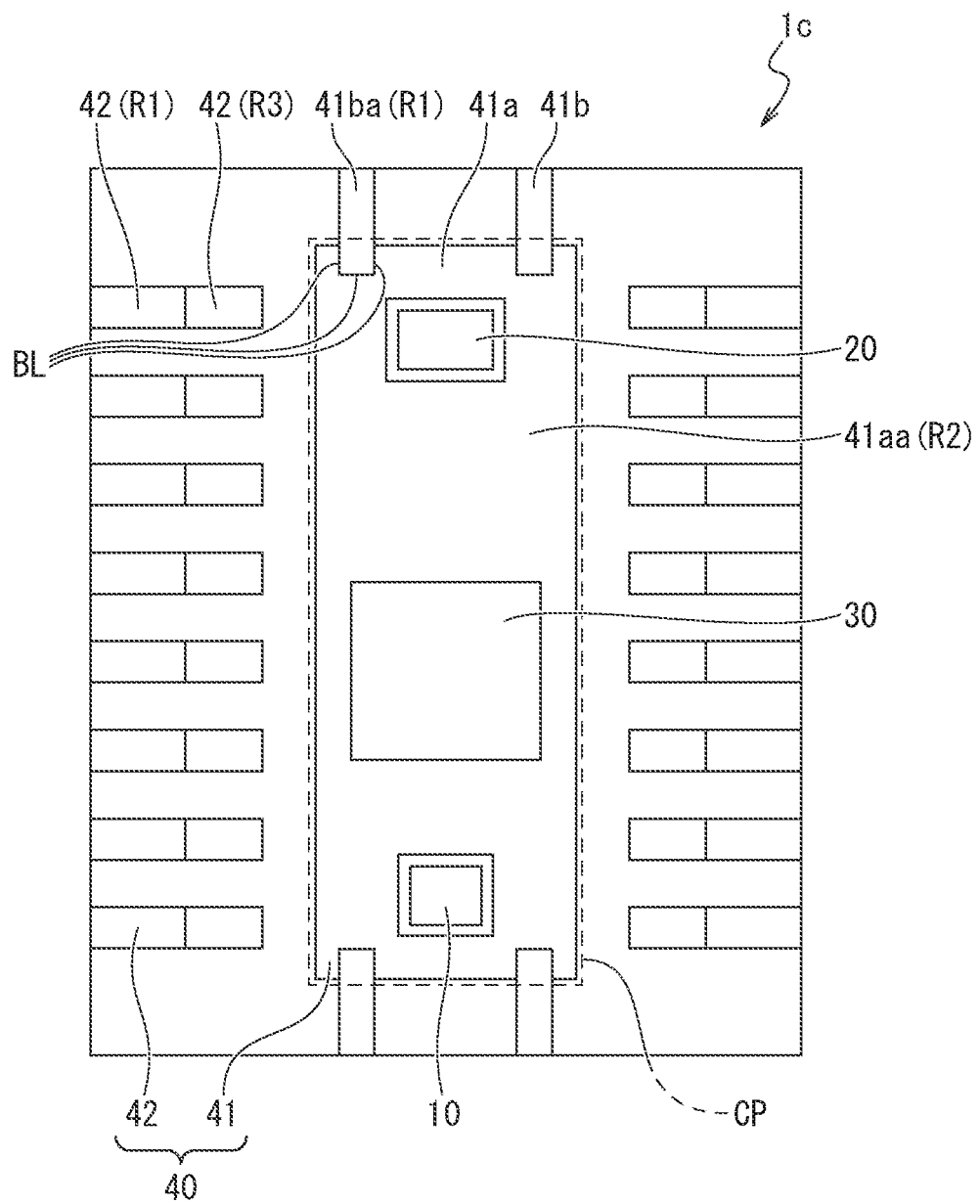
FIG. 7 is a planar schematic diagram illustrative of an example of a gas sensor according to a third embodiment of the present invention.

FIG. 7 is planar schematic diagram illustrative of an example of a gas sensor 1c according to the third embodiment. Note that, in FIG. 7, illustrations of conductive wires LW and a sealing member 80 are omitted.

The gas sensor 1c according to the third embodiment differs from the gas sensor 1 according to the first embodiment illustrated in FIG. 1 in the shapes of first regions and a second region of a die pad portion 41. Specifically, while, in the gas sensor 1 illustrated in FIG. 1, a boundary line BL serving as a boundary between one of the first regions 41(R1) and the second region 41(R2) of the die pad portion 41 is one straight line when viewed in plan, a boundary line BL between one of first regions 41ba(R1) and a second region 41aa (R2) of the die pad portion 41 is, instead of one straight line, composed of three line segments, in FIG. 7. In other words, although the die pad portion 41 includes a rectangular portion 41a and projecting portions 41b, each of the first regions 41ba(R1) of the die pad portion 41 is composed of a projecting portion 41b and a portion of the rectangular portion 41a that continues from the projecting portion 41b, and forms a region that has a rectangular shape formed by extending the projecting portion 41b when viewed in plan and that has a first thickness. In other words, as illustrated in FIG. 7, in the die pad portion 41, a boundary between each of the first regions 41ba(R1), which have the first thickness, and the second region 41aa(R2), which has a second thickness thinner than the first thickness, is composed of three line segments along three sides of an end on the second region 41aa(R2) side of the first region 41ba(R1) and is formed in such a way that the three sides of the end of the first region 41ba(R1) are surrounded by the second region 41aa(R2).

This configuration enables shape stability of the second region 41aa(R2) of the die pad portion 41 and positional stability at the time of process thereof to be improved and arrangement of a light receiving element 10 and a light emitting element 20 at locations as designed to be facilitated, as a result of which the gas sensor 1c can contribute to improvement in measurement precision.

Note that, although it is only required that, with respect to at least one projecting portion 41b among the four projecting portions 41b of the die pad portion 41, the projecting portion 41b and a portion of the rectangular portion 41a form the first region 41ba (R1) and a boundary line BL between the first region 41ba(R1) and the second region 41aa(R2) be formed by a plurality of straight lines, it is preferable that each of the four projecting portions 41b and a portion of the rectangular portion 41a of the die pad portion 41 form one of the first regions 41ba(R1) and a boundary line BL between each of the first regions 41ba(R1) and the second region 41aa(R2) be formed by, instead of one straight line, a plurality of straight lines. In addition, each of the boundary lines BL does not necessarily have to be a straight line, and it is only required that the second region 41aa(R2) be formed in such a way as to surround the periphery of the end of each of the first regions 41ba(R1).

Note that, although, in the present embodiment, one integrated circuit 30 is also arranged on the second region 41aa(R2) of the die pad portion 41, the gas sensor 1c may include a plurality of integrated circuits 30 and the plurality of integrated circuits 30 may be arranged on the second region 41aa(R2) of the die pad portion 41.

From a viewpoint of increasing contribution to improvement in measurement precision, it is preferably configured such that, as the gas sensor 1c illustrated in FIG. 7, some of line segments constituting a smallest convex polygon CP among convex polygons containing the whole of the second region 41aa(R2) of the die pad portion 41 therewithin when viewed in plan intersect the first regions 41ba(R1) of the die pad portion 41. This configuration enables the stability of the second region 41aa(R2) of the die pad portion 41 to be further improved, as a result of which measurement precision is further improved. As illustrated in FIGS. 6A to 6C in the second embodiment, when the gas sensor 1c is mounted on the mounting board 100, the first regions 41ba(R1) are preferably electrically connected to the mounting board 100 as terminal portions. Use of the metal bumps 200 that have excellent heat conduction enables temperature of the die pad portion 41 to be made more uniform.

Fourth Embodiment

Next, a fourth embodiment of the present invention will be described.

FIG. 8 is planar schematic diagram illustrative of an example of a gas sensor 1d according to the fourth embodiment. Note that, in FIG. 8, an illustration of a sealing member is omitted.

The gas sensor 1d according to the fourth embodiment differs from the gas sensor 1 according to the first embodiment illustrated in FIG. 2 in the shape of a terminal portion 42L among a plurality of terminal portions 42. The gas sensor 1d also differs from the gas sensor 1 in the shape of a rectangular portion 41aL of a die pad portion 41 in conformity with the shape of the terminal portion 42L.

Specifically, as illustrated in FIG. 8, the rectangular portion 41aL of the die pad portion 41 is formed with the gas sensor 1d placed in such a manner that an edge on the light emitting element 20 side and an edge on the light receiving element 10 side are placed on the upper side and the lower side when viewed in plan, respectively, and the rectangular portion 41aL has a notched portion 41aL1 and a first region 41aL(R1), which has a first thickness, formed on the right edge side and the left edge side, respectively, of a location that is a location between the light emitting element 20 and an integrated circuit 30 and is a location slightly on the light emitting element 20 side of a central portion in the longitudinal direction of the rectangular portion 41aL.

Note that, although, in the present embodiment, one integrated circuit 30 is also arranged on a second region 41 (R2) of the die pad portion 41, the gas sensor 1d may include a plurality of integrated circuits 30 and the plurality of integrated circuits 30 may be arranged on the second region 41(R2) of the die pad portion 41. In this case, it is preferable to form a first region having the first thickness in at least a portion of an interspace between the plurality of integrated circuits 30 when viewed in plan, in respect of durability.

In addition, in the present embodiment, a second region having a second thickness may be formed in the first region 41aL(R1), which has the first thickness, and an integrated circuit 30 is further arranged in the second region.

In addition, the shape of the terminal portion 42L that faces the notched portion 41aL1 and that is located third from an edge on the light emitting element 20 side of the gas sensor 1d among eight terminal portions 42 arranged on the right edge side of the gas sensor 1d and the shape of the terminal portion 42LL that faces the first region 41aL(R1) of the die pad portion 41 and that is located third from the edge on the light emitting element 20 side among eight terminal portions 42 arranged on the left edge side of the gas sensor 1d are different from those of the other terminal portions 42.

As illustrated in FIG. 8, when viewed in plan, the terminal portion 42L includes a region 42L(D2) that is formed by extending a terminal portion 42 in a second direction (D2), the second direction (D2) being a direction pointing to the die pad portion 41aL, and a region 42L(D1) that extends in a first direction (D1), the first direction (D1) being orthogonal to the second direction (D2), and has a shape that bends in the shape of the letter L of the alphabet. Note that the first direction (D1) does not necessarily have to be orthogonal to the second direction (D2) and the two directions may form a shape in which the two direction intersect each other and that bends obliquely. That is, a second region 42L(R2) b is only required to be arranged close to the integrated circuit 30. As used herein, the term "intersect" means that two or more line segments intersect one another at a point and is not a term that means only a form in which the line segments perpendicularly intersect one another.

In addition, the terminal portion 42L, as with the terminal portions 42, includes a first region 42L(R1)a that has the first thickness and a second region 42L(R2)a that has the second thickness in this order from the right edge side of the gas sensor 1d. Further, the terminal portion 42L includes a first region 42L(R1)b that continues from the second region 42L(R2)a and that has the first thickness and a second region 42L(R2)b that continues from the first region 42L(R1)b and that has the second thickness. The first region 42L(R1)b includes a region that continues from the second region 42L(R2)a and that extends to the end in the second direction and a region occupying approximately one-eighth of the whole of a region that continues from the region extending to the end in the second direction and that extends in the first direction. The second region 42L(R2)b includes a region that is the region extending in the first direction excluding the first region 42L(R1)b. The second region 42L(R2)b, which has the second thickness, forms a bonding region 42L(R3).

On the other hand, the terminal portion 42LL has a shape in which a second region 42(R2) in a terminal portion 42 extends, includes a first region 42LL(R1) and a second region 42LL(R2) that continues from the first region 42LL(R1) and that has the second thickness, and has the end of the second region 42LL(R2) on the opposite side to the first region 42LL(R1) continuing to the first region 41aL(R1), which is formed on the rectangular portion 41aL and has the first thickness.

The form illustrated in FIG. 8 is sometimes preferable because the form enables layout of electrical connections via conductive wires LW to be facilitated and the whole of the gas sensor 1d to be miniaturized. In other words, as illustrated in FIG. 8, the terminal portion 42L has the end on the die pad portion 41 side extended to a vicinity of a central portion in the width direction of the die pad portion 41. Thus, disposing a terminal at an edge portion on the light emitting element 20 side of the integrated circuit 30 and connecting the terminal to the second region 42L(R2)b, which is the bonding region 42L(R3), of the terminal portion 42L, using a conductive wire LW enable the wiring to be performed using a short conductive wire LW and routing of wires to be easily performed.

In addition, the first region 41aL(R1) is disposed on the opposite side to the notched portion 41aL1 of the rectangular portion 41aL, and the first region 41aL(R1) has a thickness thicker than the thickness of the second region 41(R2). This configuration enables reduction in stability of the rectangular portion 41a due to the disposition of the notched portion 41aL1 to be suppressed.

In the terminal portion 42L, the region extending in the second direction preferably includes regions the thicknesses of which are different from one another. Specifically, as illustrated in FIG. 8, a portion of the region extending in the second direction is preferably the second region 42L(R2) a the thickness of which is thinner than that of a first region. This configuration enables sealing resin to flow smoothly, misalignment of the light receiving element 10 and the light emitting element 20 to be suppressed, and deterioration in measurement precision to be suppressed when a lead frame 40, the light receiving element 10, the light emitting element 20, and the integrated circuit 30 are sealed with the sealing member 80 by molding. Note that, since the second region 42L(R2)a is disposed for the purpose of causing sealing resin to flow smoothly, the second region 42L(R2)a does not necessarily have to have the second thickness and is only required to have a thickness thinner than the first thickness. From a viewpoint of causing sealing resin to flow smoothly, the second region 42L(R2)a preferably has a thickness equal to the thickness of the second regions 42(R2) of the other terminal portions 42.

Variation of Fourth Embodiment

FIG. 9 is planar schematic diagram illustrative of an example of a gas sensor 1e in the fourth embodiment. The gas sensor 1e is configured such that, in the gas sensor 1d illustrated in FIG. 8, two terminal portions 42L1 and 42L2 that face a notched portion 41aL1 and that are located adjacent to each other include regions 42L1(D2) and 42L2(D2) that extend in the second direction (D2), respectively and, further, both the ends of the regions 42L1(D2) and 42L2(D2) are connected to a region 42L12(D1) that extends in the first direction (D1).

In addition, the terminal portion 42L1, as with terminal portions 42, includes a first region 42L1(R1)a that has the first thickness and a second region 42L1(R2)a that has the second thickness in this order from the right edge side of the gas sensor 1e and further includes a first region 42L1(R1)b and a second region 42L1(R2)b that has the second thickness. Likewise, the terminal portion 42L2, as with the terminal portions 42L1, includes a first region 42L2(R1)a that has the first thickness and a second region 42L2(R2)a that has the second thickness in this order from the right edge side of the gas sensor 1e and further includes a first region 42L2(R1)b and a second region 42L2(R2)b that has the second thickness.

The region 42L12(D1) includes a first region 42L12(R1) that has the first thickness and a second region 42L12(R2) that continues from the first region 42L12(R1) and that has the second thickness.

This configuration is sometimes preferable because forming the two terminal portions 42L1 and 42L2, which face the notched portion 41aL1, in the shapes illustrated in FIG. 9 enables shape stability to be improved. In addition, in FIG. 9, second regions (42L1(R2)a, 42L1(R2)b, 42L2(R2)a, and 42L2(R2)b) that have a thickness thinner than the thickness of the first regions R1 are formed at two locations on each of the regions 42L1(D2) and 42L2(D2), which extend in the second direction. This configuration is sometimes preferable because the configuration enables a dead end between the two regions 42L1(D2) and 42L2(D2) extending in the second direction to be opened and effect of causing sealing resin to flow smoothly to emerge.

[Manufacturing Method]

Next, an example of a method for manufacturing the gas sensor 1 according to the present embodiment will be described. A method for manufacturing the gas sensor 1 according to the first embodiment will be described below using FIGS. 10A to 10D. FIGS. 10A to 10D are cross-sectional schematic diagrams taken along the line F-F' in FIG. 1.

First, on a heat-resistant tape 201, a lead frame 40 that has been subjected to patterning and half-etching and in which a die pad portion 41 that includes a first regions 41(R1) having the first thickness and a second region 41 (R2) having a thickness thinner than the first regions 41 (R1) and terminal portions 42 are formed is arranged (FIG. 10A). In order to facilitate wire bonding, which will be described later, the surface of the lead frame 40 may be subjected to plating.

Subsequently, a light receiving element 10 and a light emitting element 20 are arranged in regions (a light receiving element arrangement region 41c and a light emitting element arrangement region 41d) surrounded by a second region 41(R2) of the die pad portion 41 on the heat-resistant tape 201 via an adhesive layer of the heat-resistant tape 201, an integrated circuit 30 is arranged on the second region 41 (R2) of the die pad portion 41 preferably via an adhesive agent or a film having high thermal conductivity, and the light receiving element 10 and the integrated circuit 30, the light emitting element 20 and second regions 42(R2) of respective terminal portions 42, and the integrated circuit 30 and second regions 42(R2) of respective terminal portions 42 are respectively wire-bonded to each other, using conductive wires LW (FIG. 10B). In FIG. 10B, for the sake of simplification, a conductive wire LW connecting the light receiving element 10 and the integrated circuit 30 to each other and a conductive wire LW connecting the light emitting element 20 and the second region 42 (R2) of a terminal portion 42 to each other are illustrated.

Subsequently, a lower mold 203 is arranged on the side where the heat-resistant tape 201 is arranged, an upper mold 202 is arranged on the opposite side to the side where the heat-resistant tape 201 is arranged, and sealing resin that serves as a sealing member 80 is injected into a space sandwiched between the heat-resistant tape 201 and the upper mold 202 (FIG. 10C).

Subsequently, the upper mold 202 and the lower mold 203 are removed, and the heat-resistant tape 201 is also removed. By dicing a region having kerf width W, using a dicing apparatus and individual pieces being thereby cut out and being turned over, the gas sensor 1 on the upper surface side of which portions of the light receiving element 10 and the light emitting element 20 are exposed is obtained (FIG. 10D).

Although the embodiments of the present invention were described above, the above-described embodiments indicate devices and methods to embody the technical idea of the present invention by way of example, and the technical idea of the present invention does not limit the materials, shapes, structures, arrangements, and the like of the constituent components. The technical idea of the present invention can be subjected to a variety of alterations within the technical scope prescribed by the claims described in CLAIMS.

REFERENCE SIGNS LIST 1, 1a to 1e Gas sensor
10 Light receiving element
20 Light emitting element
30 Integrated circuit
40 Lead frame
41 Die pad portion
41a, 41aL Rectangular portion
41aL1 Notched portion
41b Projecting portion
41(R1), 41ba(R1), 41aL(R1) First region of a die pad portion
41(R2), 41aa(R2) Second region of a die pad portion
42, 42L, 42L1, 42L2, 42LL Terminal portion
42(R1), 42L1(R1) First region of a terminal portion
42(R2), 42L2(R2) Second region of a terminal portion
60 Light reflection portion
60a Cavity portion
60b Reflecting surface
70 Optical member
80 Sealing member
100 Mounting board
110 Mounting terminal
200 Metal bump
BL Boundary line
LW Conductive wire

What is claimed is:

1. A gas sensor, comprising:
   a light receiving element;
   a light emitting element;
   an integrated circuit;
   a conductive lead frame; and
   a sealing member configured to seal the light receiving element, the light emitting element, the integrated circuit, and the lead frame into a package,
   wherein the lead frame includes at least one die pad portion and a plurality of terminal portions, wherein at least the die pad portion includes a first region having a first thickness and a second region having a second thickness thinner than the first thickness, and
   wherein the integrated circuit is arranged on the second region of the die pad portion and is electrically connected to at least one of the plurality of terminal portions.

2. The gas sensor according to claim 1, wherein:
   the light emitting element is electrically connected to at least one of the plurality of terminal portions, and
   the light receiving element is electrically connected to the integrated circuit and is arranged on an opposite side to the light emitting element with the integrated circuit interposed between the light receiving element and the light emitting element.

3. The gas sensor according to claim 2, wherein the light emitting element is neither electrically connected directly to the light receiving element nor to the integrated circuit.

4. The gas sensor according to claim 3, wherein the light receiving element is electrically connected to the integrated circuit via a conductive wire.

5. The gas sensor according to claim 4, wherein:
   the light emitting element and the integrated circuit are mounted on a mounting board, and
   the light emitting element is electrically connected to the integrated circuit via the mounting board.

6. The gas sensor according to claim 1, wherein the first region of the die pad portion is arranged at a periphery of the second region and is arranged in such a way that the second region surrounds a portion of an end of the first region.

7. The gas sensor according to claim 6, wherein a plurality of the first regions of the die pad portion are arranged in such a way that the second region surrounds portions of ends of the first regions.

8. The gas sensor according to claim 7, wherein, when viewed in plan, some of line segments constituting a smallest convex polygon including a whole of the second region of the die pad portion within the convex polygon intersect the first regions of the die pad portion.

9. The gas sensor according to claim 1, wherein:
the plurality of terminal portions are arranged in a line along the die pad portion on both sides of the die pad portion with the die pad portion interposed between the terminal portions,
at least one terminal portion among terminal portions electrically connected to the integrated circuit includes a region extending in a second direction, the second direction intersecting a direction in which the plurality of terminal portions are lined, and a region extending in a first direction, the first direction intersecting the second direction and coming close to the integrated circuit, between the integrated circuit and the light emitting element and includes a bonding region at a tip of the region extending in the first direction, and
the integrated circuit and the bonding region are connected to each other by a conductive wire.

10. The gas sensor according to claim 9, wherein:
each of a plurality of terminal portions among terminal portions electrically connected to the integrated circuit includes a region extending in the second direction, and
a region extending in the second direction of each of the plurality of terminal portions including regions extending in the second direction is connected to a common region extending in the first direction.

11. The gas sensor according to claim 10, wherein a region extending in the second direction includes, in the region, regions having different thicknesses.

12. The gas sensor according to claim 1, wherein the integrated circuit is electrically connected to at least one of the plurality of terminal portions via a conductive wire.

13. The gas sensor according to claim 12, wherein:
the terminal portion to which the conductive wire is connected among the plurality of terminal portions includes a bonding region, and
thickness of the bonding region is thinner than the first thickness.

14. The gas sensor according to claim 13, wherein:
the bonding region has plating on a surface of the bonding region, and
the conductive wire is directly connected to the plating.

15. The gas sensor according to claim 1, wherein the integrated circuit outputs a control signal for controlling the light emitting element and, when a signal from the light receiving element is input, performs amplification and AD conversion.

16. A gas sensor, comprising:
a light receiving element;
a light emitting element;
an integrated circuit;
a lead frame; and
a sealing member configured to seal the light receiving element, the light emitting element, the integrated circuit, and the lead frame into a package,
wherein the lead frame includes at least one die pad portion and a plurality of terminal portions, wherein at least the die pad portion includes a first region having a first thickness and a second region having a second thickness thinner than the first thickness,
wherein the integrated circuit is arranged on the second region of the die pad portion and is electrically connected to at least one of the plurality of terminal portions,
wherein each of the terminal portions has the first region and the second region, and
wherein the gas sensor includes a first surface on which only a portion of each of the plurality of terminal portions, a portion of the die pad portion, and a portion of the sealing member are exposed.

17. A gas sensor, comprising:
a light receiving element;
a light emitting element;
an integrated circuit;
a lead frame; and
a sealing member configured to seal the light receiving element, the light emitting element, the integrated circuit, and the lead frame into a package,
wherein the lead frame includes at least one die pad portion and a plurality of terminal portions, wherein at least the die pad portion includes a first region having a first thickness and a second region having a second thickness thinner than the first thickness,
wherein the integrated circuit is arranged on the second region of the die pad portion and is electrically connected to at least one of the plurality of terminal portions,
wherein each of the terminal portions has the first region and the second region, and
wherein the gas sensor includes a second surface on which only a portion of each of the plurality of terminal portions, a portion of the die pad portion, a portion of the light receiving element, a portion of the light emitting element, and a portion of the sealing member are exposed.

18. The gas sensor according to claim 17, comprising:
a light reflection portion internally including a cavity portion covering at least a portion of the second surface.

19. The gas sensor according to claim 17, further comprising:
an optical member arranged in such a manner as to directly or indirectly cover an exposed portion of at least either the light emitting element a portion of which is exposed or the light receiving element a portion of which is exposed and configured to transmit light having a desired wavelength.

* * * * *